Feb. 18, 1941.  A. P. KING  2,232,179
TRANSMISSION OF GUIDED WAVES
Filed Feb. 5, 1938  6 Sheets-Sheet 1

$E_{01}$ WAVE $E_{11}$ WAVE $H_{01}$ WAVE $H_{11}$ WAVE

INVENTOR
A. P. KING
BY
H. A. Burgess
ATTORNEY

Feb. 18, 1941.  A. P. KING  2,232,179
TRANSMISSION OF GUIDED WAVES
Filed Feb. 5, 1938  6 Sheets-Sheet 2
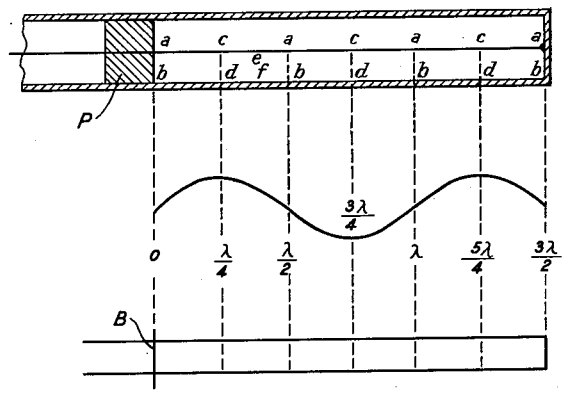
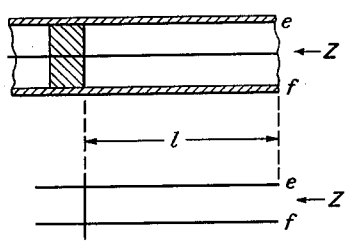
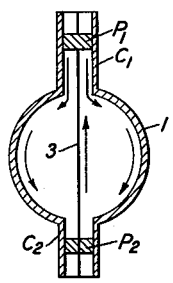
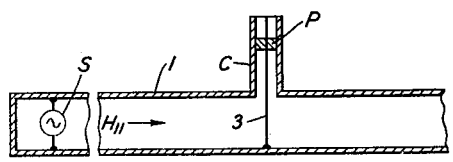
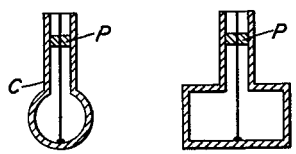
INVENTOR
*A. P. KING*
BY
ATTORNEY

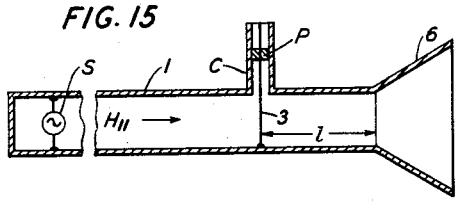
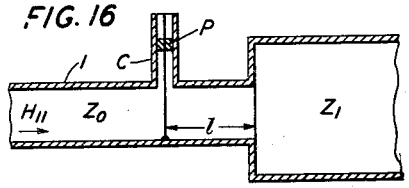
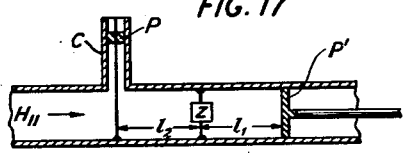
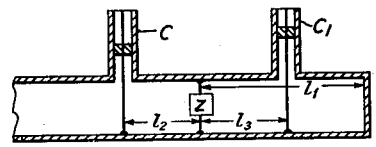
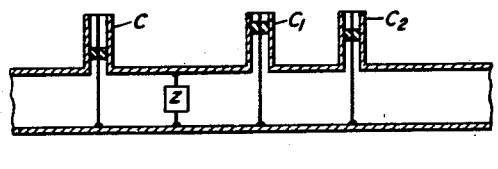
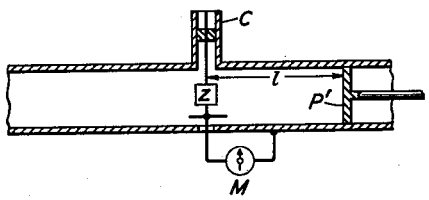
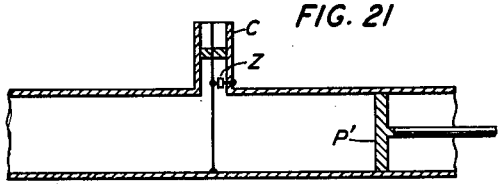
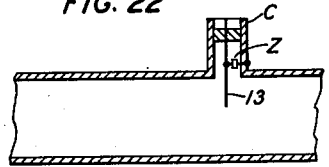

Feb. 18, 1941.  A. P. KING  2,232,179
TRANSMISSION OF GUIDED WAVES
Filed Feb. 5, 1938  6 Sheets-Sheet 4
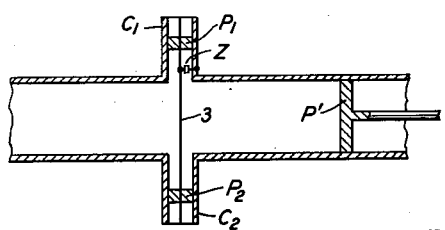
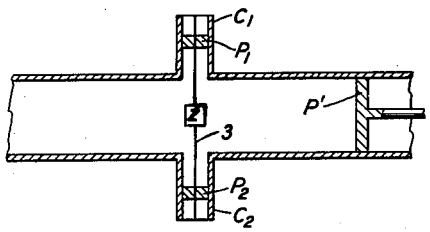
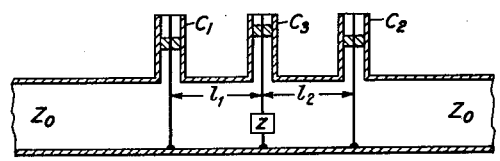
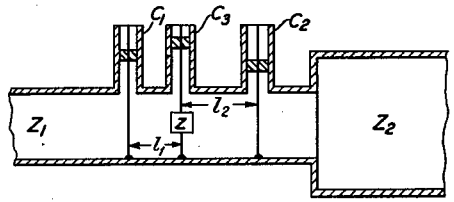
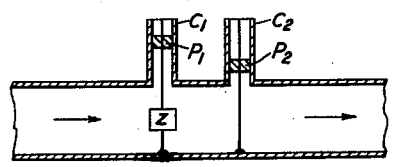
FIG. 28  FIG. 29  FIG. 30
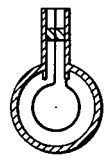 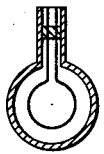 
FIG. 31  FIG. 32  FIG. 33
 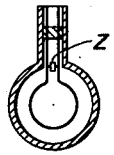 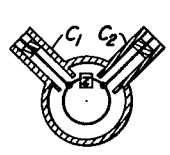
INVENTOR
A. P. KING
BY
ATTORNEY

INVENTOR
A. P. KING
BY
ATTORNEY

Feb. 18, 1941.  A. P. KING  2,232,179
TRANSMISSION OF GUIDED WAVES
Filed Feb. 5, 1938  6 Sheets-Sheet 6

INVENTOR
A. P. KING
BY
ATTORNEY

Patented Feb. 18, 1941

2,232,179

UNITED STATES PATENT OFFICE 2,232,179

TRANSMISSION OF GUIDED WAVES

Archie P. King, Red Bank, N. J., assignor to Bell Telephone Laboratories, Incorporated, New York, N. Y., a corporation of New York Application February 5, 1938, Serial No. 188,841

24 Claims. (Cl. 178—44)

This invention relates to the transmission of electromagnetic waves, and more particularly to the transmission of ultra high frequency electromagnetic waves through metallic pipe guides.

It has been shown heretofore how certain kinds of electromagnetic waves can be propagated through the interior of a metallic pipe containing a dielectric medium if the frequency of the waves exceeds a critical frequency related to the transverse dimensions of the pipe. In practical systems of this general kind there is need for means providing an efficient coupling between the wave guide and the wave launching means, and between the guide and the wave receiving means or load, and in various other parts of such systems it is often desired that two elements of different impedance be coupled efficiently together so that wave energy is transmitted substantially without reflection from the one element to the other. For such purposes and for other purposes, there is need also for means having an effect analogous to that of a reactive impedance or phase shifter in conventional two-wire transmission systems.

A principal object of the present invention is to improve the coupling between the various parts of a guided wave system of the kind to which the invention relates.

Another object is to provide means for use in such a system to simulate the effect of a reactive impedance, a phase shifter, or a reflector.

In accordance with the present invention the foregoing objects and other objects that will appear hereinafter are achieved by means comprising a circuit conforming with the electric field of the waves within the guide in combination with one or more sections of shielded transmission line of such length and electrical properties as to affect the waves in manner and degree appropriate to the particular purpose of the combination, whether it be impedance matching, phase shifting, reflection, or etc.

The nature of the invention will appear more fully in the following description of various specific illustrative embodiments thereof. Reference will be made to the accompanying drawings, in which:

Figs. 9 and 10 are illustrative of certain principles involved in the present invention;

Figs. 11 to 14 show simple forms of reactive elements in accordance with the invention;

Fig. 15 shows means for matching impedances in a system for the transmission of radio waves to or from a wave guide;

Fig. 16 shows a similar combination in which the waves are transmitted from one wave guide to another of different impedance;

Figs. 17 to 24 show various impedance matching terminations in accordance with the invention;

Figs. 25, 26 and 27 represent attenuators utilizing the principles of the invention;

Figs. 28 to 33 illustrate the adaptation of the invention to systems utilizing the symmetric magnetic type of guided wave;

Figure 1:
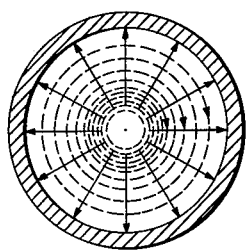
Figs. 1 to 8 are diagrams depicting the electromagnetic fields of four types of guided waves that can exist within a metallic pipe.
Figure 2:
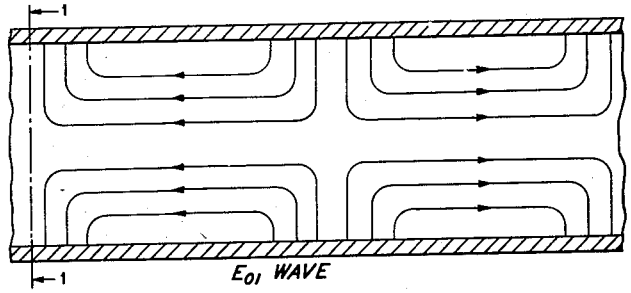
Figure 3:
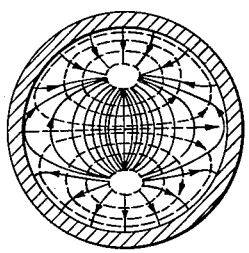
Figure 4:
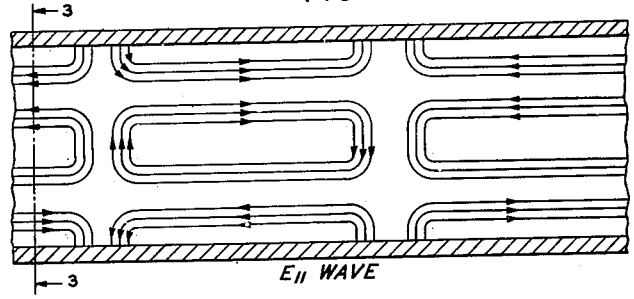
Figure 5:
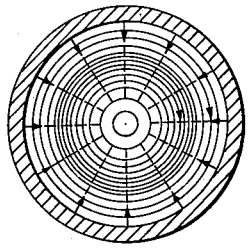
Figure 6:
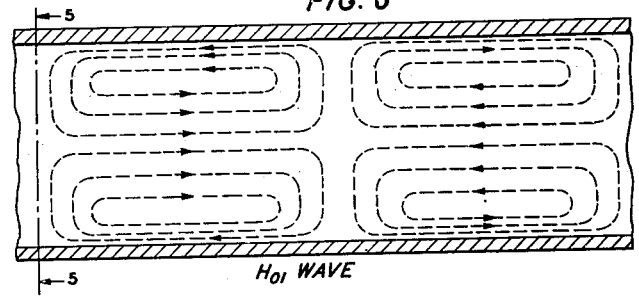
Figure 7:
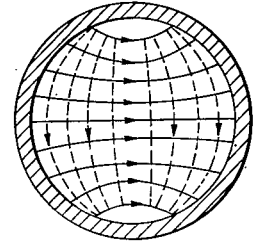
Figure 8:
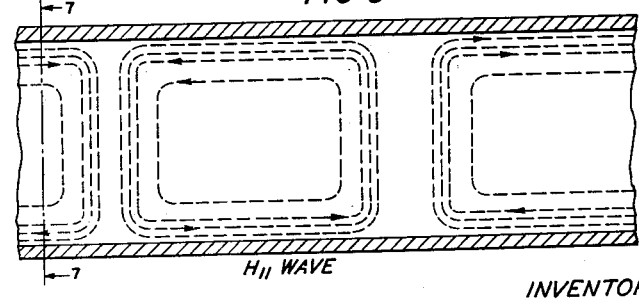

Referring now more particularly to the first eight figures of the drawings, Figs. 1 and 2 show a tubular metallic guide and the typical field pattern of the so-called symmetric electric or $E_{01}$ wave. In these two figures as in the six that follow, solid lines represent lines of electric intensity and dotted lines represent lines of magnetic intensity. As will appear from Figs. 1 and 2, the electric field of the $E_{01}$ wave has a substantial radial component and a substantial longitudinal component, the latter component being most intense at the axis of the guide. The magnetic field is circular and coaxial with the guide. Figs. 3 and 4 show similarly the electric and magnetic fields of the asymmetric electric or $E_{11}$ type of wave, where again the magnetic field is wholly transverse to the axis of the guide and the electric field has both transverse and longitudinal components. Figs. 5 and 6 represent the field of the symmetric magnetic or $H_{01}$ wave, the electric field in this case being circular and coaxial with the guide. Figs. 7 and 8 represent the asymmetric magnetic or $H_{11}$ type of wave, in which the lines of electric intensity extend from one side of the guide to the other, the region of maximum intensity being a diametral plane. These four types of dielectrically guided waves, each distinguished by its characteristic spacial distribution of the electric and magnetic fields, are illustrative only of the many possible types of such waves.

To facilitate an understanding of the present invention, reference is made to Fig. 9 which illustrate certain characteristics of tuned transmission lines. One of the two lines shown is of the coaxial conductor type and the other is an ordinary two-wire line, both being short-circuited at one end and again at a point one and one-half wave-lengths from that end, by a piston P in the one case and by a bridge B in the other. Assuming the line to be energized from a suitable source of alternating current, a standing wave system is established with voltage nodes at the ends and at the intermediate half-wave points and with voltage anti-nodes at the three-quarter points. The zero voltage points are marked $ab$ and the points of maximum voltage $cd$.

One may regard the low voltage points $ab$ as points of low impedance and the high voltage point $cd$ as points of high impedance, for such impedances are presented to any element or circuit connected at those points. At points intermediate $ab$ and $cd$, intermediate values of impedance are found. If the system has relatively low energy losses these impedance values may range between widely separated limits.

Suppose now that the resonant lines of Fig. 9 be broken at any arbitrary point $ef$ and the impedance Z of the left-hand portions be viewed from the break, as illustrated in Fig. 10. Since the standing wave is due to reflection from the short-circuiting means, the standing wave distribution is similar. Consequently, when the length $l$ of the line is a quarter wave-length the impedance presented at $ef$ will be high and when a half wave-length or multiple thereof, the impedance will be low. For intermediate lengths $l$, if the conductors are of low loss, the impedance will be largely reactive, adjustable over a wide range of values, and either inductive or capacitive depending upon the position of the short-circuiting means.

With this introduction, attention is now directed to Fig. 11 which shows a metallic pipe 1, of copper, for example, containing a gaseous or other dielectric medium for the guided transmission of high frequency electromagnetic waves launched from a source S. As indicated in Figs. 12 and 13, the guide may be circular or rectangular in cross-section or of any other suitable cross-section for that matter, but in this illustrative embodiment, as in others that are to follow, it will be assumed that the guide is of circular cross-section. So also it may be assumed that the source S is adapted to launch guided waves of the type identified as $H_{11}$, having lines of electric force lying along and parallel to a diameter of the pipe.

In the path of the waves transmitted through the pipe 1 is interposed a conducting wire 3 which at one end is electrically connected to the pipe wall and which extends diametrally across the pipe and through an opening in the pipe wall to form the inner conductor of a coaxial conductor pair C branching radially outwards from the pipe. The coaxial pair C is short-circuited, at least for high frequency currents, by means of a piston P. The wire 3 is preferably aligned with the transverse electric field of the guided wave so that the latter is most effective in inducing a corresponding electromotive force in the wire.

Associated with the portion of the wire 3 that is within the pipe is a certain amount of reactance, and likewise with the coaxial extension there is associated an amount and kind of reactance, inductive or capacitive, which may be regulated by adjustment of the piston P as explained with reference to Fig. 10. For one adjustment of the piston the net reactance of the circuit comprising wire 3 and coaxial unit C is substantially zero at the frequency of the incident waves, and the intensity of the induced current is limited only by the resistance of the circuit. For another piston adjustment the net reactance of the circuit is high, tending to approach infinite reactance as the resistance of the circuit is reduced, and the induced current is correspondingly small. At intermediate piston positions the circuit is largely reactive, either inductive or capacitive depending on the length of the coaxial line.

In the first of the three cases considered above where the net reactance of the circuit is substantially zero, there is substantially zero impedance presented to the guided wave in the pipe 1 and the combination functions as a reflecting barrier in preventing the flow of energy past it. It has been found, for example, that when brass is used as the material for all of the elements of Fig. 11, critical adjustment of the piston reduced the flow of energy so that the field beyond the wire 3 was approximately 2 per cent of the field present with the wire 3 removed. Replacing the brass wire 3 with copper wire reduced the residual field to about 1 per cent. This condition was obtained at a total wire length approximating an integral number of half wave-lengths. It is evident that by using silver or other highly conductive materials in the coaxial system and in the adjacent wave guide wall further reduction in the amount of energy passing the combination can be achieved.

In the second case above where the reactance of the circuit is high, the combination was found to present to the guided waves a relatively high shunting impedance which had little effect on them. This condition was obtained with the piston adjusted to a position such that the total wire length was about a quarter wave-length or an odd multiple thereof.

In the third case where the reactance of the circuit ranges between the two extremes, corresponding intermediate values of reactance are presented to the guided waves. Thus, by providing along a wave guide a number of reactive combinations of the kind illustrated in Fig. 11, the guide may be loaded in a manner not unlike the inductive loading used to improve the transmission characteristics of an ordinary telephone line. In meeting a particular transmission requirement the loading may be either inductive or capacitive. The effect of the reactive combination may be thought of also in terms of phase shift in the guided waves, for the guided waves are advanced or retarded in phase depending on the nature of the reactance presented and in amount depending on its magnitude. The currents established in the diametral wire 3 by induction may be considered as giving rise to a new set of guided waves the phase of which is determined by the phase of the induced currents and ultimately by the reactance of the circuit comprising wire 3. Thus, over the range of piston adjustments here considered the combination illustrated in Fig. 11 comprises both an adjustable phase shifter and an adjustable lumped reactor.

In Fig. 14 is shown in cross-section a structure similar to the one illustrated in Figs. 11 and 12 but in which a coaxial extension $C_1$, $C_2$, is provided at both ends of the diametral wire 3, each coaxial extension being short-circuited by a respective adjustable piston $P_1$, $P_2$. The net circuit reactance is dependent on the positions of both pistons and the latter may be adjusted to produce the same effects as are obtained with the structure shown in Figs. 11 and 12. To this extent, at least, the two structures are equivalents and one may be substituted for the other in various embodiments hereinafter to be described. The arrows in Fig. 14 indicate the path and instantaneous direction of currents induced by $H_{11}$ waves passing through the guide 1.

In the embodiment of applicant's invention shown in Fig. 15, an adjustable coaxial unit C and diametral wire 3 as hereinbefore described are employed to improve the coupling between the wave guide 1 and a metallic horn 6 which opens into free space for the directed radiation of the guided waves. At the junction of guide and horn an impedance discontinuity may appear, which makes itself evident by standing waves within the guide. It is found that the reactive part of any such impedance discontinuity can be canceled, with a net gain in radiation from the horn, by proper adjustment of the coaxial piston P. In most, if not in all cases, it has been found that with the piston thus adjusted for maximum radiation no standing waves appear between the source S and the coaxial unit. The distance $l$ between the coaxial unit and the horn is not critical, although it does affect the optimum piston adjustment and distances approaching a half wave-length or a multiple thereof are to be avoided for best results.

With the source S of Fig. 15 replaced by a crystal or other detector the combination is operable for the reception of ultra high frequency radio waves and the coaxial unit may be adjusted in the same manner to increase the amount of power reaching the detector.

Where a wave guide of one characteristic impedance $Z_0$ is connected in tandem with another guide having a different characteristic impedance $Z_1$, reflection occurs at the junction unless precautions are taken to prevent it. In accordance with the present invention as illustrated in Fig. 16, a coaxial unit of the kind shown in Fig. 12 is inserted near the junction point. Piston P of the coaxial unit is adjusted to such position that reflection of the incident wave is minimum. It has been found that a fairly good impedance match can be obtained over a range of distances $l$ and corresponding piston positions just as in Fig. 15.

Figs. 17 and 18 show a combination in accordance with the invention for matching an impedance element Z to the wave guide. The impedance element is representative of a detector, generator, energy sink or other like circuit element, but for purposes of specific illustration it will be treated as a detector. In Fig. 17 then, the incoming guided waves are transmitted past a coaxial unit C and the detector to an adjustable metallic piston P' constituting a reflector which is to be so adjusted that a maximum amount of the incoming wave energy is directed into the detector. By a series of adjustments of coaxial piston P and of distances $l_1$ and $l_2$ a combination of adjustments may be found which will cause substantially all of the available energy to be absorbed in the detector. If the impedance element Z is not of such nature that the current flowing therein can be readily measured, a standing wave detector may be employed ahead of the coaxial unit so as to observe the effect of each adjustment.

The combination illustrated in Fig. 18 is similar to the one just described but the adjustable piston P' is replaced by a fixed end cap, and another coaxial unit $C_1$ is interposed between the end cap and the impedance element Z. The added coaxial unit may be considered as a phase shifter, the function of which is to adjust the phase of the waves reflected from the end cap so that the reflected waves arriving at the impedance element Z have the same phase as in Fig. 17. By proper adjustment of the two coaxial pistons and of the three distances indicated in the figure a combination can be reached for which the impedance of element Z is virtually matched with the impedance of the guide.

Fig. 19 may be compared with Fig. 18 for it is the same except that a coaxial unit $C_2$ adjusted to act as a reflector replaces the reflecting end cap of Fig. 18. It will be noted that with the combination shown in Fig. 19 other types of guided waves and even $H_{11}$ waves of different polarization may be transmitted through the guide without being substantially affected by the termination for the $H_{11}$ wave represented.

A simplification of the termination for an $H_{11}$ wave results from combining impedance element Z with the transverse coaxial circuit. Two forms are illustrated, that in Fig. 20 comprising the impedance element Z in series in the coaxial circuit and that in Fig. 21 comprising the impedance element in shunt of the coaxial circuit. The combination of impedance element and coaxial unit operates as a variable impedance and by proper adjustment of the piston P' and of the coaxial piston an impedance matching termination can be realized. Usually it is sufficient to tune the assemblage for maximum current as it is found that maximum current and an impedance matching termination are both obtained with the same adjustment of the variables. To measure the current the diametral wire may be brought out through a by-pass condenser to a meter M as in Fig. 20.

It may be added, with reference to Figs. 17 to 21, that the position of the impedance element along the diametral wire or the coaxial pair affords another degree of variability, and one position or another may be found more favorable in a particular case for effecting an impedance match with minimum transformation losses.

Another application of the coaxial unit is shown in Fig. 22 where the combination is one adapted for monitoring or measuring purposes. Here the object is to extract from the guided wave the least amount of power necessary for operation of a measuring instrument. The combination comprises the branch coaxial line C, the inner conductor of which extends as a probe or short antenna radially into the guide and in alignment with the transverse electric field of the $H_{11}$ wave. The impedance Z shunted across the coaxial line may be a crystal detector suitable for operation of a measuring instrument or signal reproducing system. The coaxial piston is adjusted to increase the detector circuit sensitivity by altering the impedance of the detector to a more favorable value for the antenna to work into and consequently increase the current flow to an external circuit. The use of the short probe has the disadvantage that only a small part of the guided wave field is sampled, which under some conditions might tend to give an erroneous reading because of irregularities in the wave guide or because of distortion present in the wave. Moreover, the extraction of a relatively large amount of power with the probe tends to distort the field. These difficulties are minimized by use of the arrangement shown in Figs. 23 and 24.

Figs. 23 and 24 are alike in the use of a diametral wire 3 and oppositely extending coaxial units $C_1$ and $C_2$ as in Fig. 14, but in Fig. 23 the impedance element Z is connected in shunt across the coaxial line whereas in Fig. 24 it is connected in series in the diametral wire 3. The impedance element Z may be, for example, a crystal detector. For measuring and monitoring purposes the crystal detector is matched into the coaxial circuit by adjusting the position of the detector along the wire 3, the circuit being tuned to resonance by proper adjustment of the pistons $P_1$, $P_2$. By simultaneous movement of the pistons $P_1$ and $P_2$ in the same direction the impedance presented to the wave in the guide may be adjusted and thereby the amount of power extracted by the transverse circuit controlled. Preferably, this adjustment is such that a high impedance is presented to the wave guide, which is of relatively low impedance, and under these conditions the impedance mismatch limits the power extracted from the wave and the monitoring circuit may be made to appear as a high resistance so that a minimum impedance discontinuity results. Pistons P' are used only when the structures are intended for the purpose next to be described.

The combinations illustrated in Figs. 23 and 24 are capable of use for another purpose similar to that of the combinations shown in Figs. 20 and 21. It has been shown hereinbefore how the latter combinations may be adjusted to obtain an impedance match between the wave guide and an impedance element, but the impedance match is obtained only for a unique adjustment of piston P' and coaxial piston P. By using the double coaxial system shown in Figs. 23 and 24 an impedance match can again be obtained but it will be found that a fair impedance match will be obtained for a number of different adjustments of the piston P' and of the coaxial pistons. This is due to the adjustable impedance transformation properties of the double coaxial system.

Referring briefly to Fig. 9, it is well known that through the intermediary of a resonant transmission line such as there depicted it is possible to obtain an impedance match between two dissimilar impedance elements by connecting each element to the line at a respective point where the impedance presented by the line at that point is equal in magnitude to the impedance of the element. The introduction of the impedance element incidentally introduces a certain amount of reactive loading which tends to impair the impedance match but compensation for this effect can be made by changing slightly the length of the line. The behavior of the combinations shown in Figs. 23 and 24 is somewhat analogous, for the two coaxial units comprise a resonant system at respective points along which are connected two elements for impedance matching, one of these elements being the impedance element Z and the other being the wave guide. Thus the impedance presented to the incident guided waves depends on what part of the resonant circuit comprising wire 3 is exposed to them, and the latter may be adjusted by simultaneous movement of the two coaxial pistons in the same transverse direction.

In the practical adjustment of an impedance transformer such as that shown in Fig. 24, the piston P' may be arbitrarily positioned and the two coaxial pistons $P_1$ and $P_2$ simultaneously adjusted for maximum absorption of power in the impedance element Z. After moving the piston P' an arbitrary small distance the coaxial pistons may then be readjusted, and this procedure repeated until it is found that substantially all of the incident wave energy is directed into the impedance element and no standing waves are observable to the left of that element.

Figs. 25 to 27 illustrate the application of the present invention to attenuators for wave guide systems. In Fig. 25 it is supposed that the attenuator is faced with the same wave guide impedance $Z_0$ in both directions and that it is desired that the attenuator shall match both of these impedances. The dissipative element Z, preferably a pure resistance, is associated with a coaxial branch line $C_3$, the series form of connection being shown for illustrative purposes. On either side and spaced equal distances $l_1$ and $l_2$ from element Z are the coaxial reactance units $C_1$ and $C_2$. By adjustment of the coaxial unit $C_3$, element Z may be made to appear to the wave as a pure resistance, any reactive impedances associated with it or its connecting leads thereby being canceled out. The amount of attenuation is then determined by the adjustment of the coaxial units $C_1$ and $C_2$, and inasmuch as the system is symmetrical a common control may be provided for the pistons comprising these two units.

Fig. 26 shows an impedance matching attenuator interposed at the junction of two guides having dissimilar characteristic impedances $Z_1$ and $Z_2$. In this case the coaxial units $C_1$ and $C_2$ are spaced unequal distances $l_1$ and $l_2$ from the impedance element Z and its associated coaxial unit $C_3$. The coaxial units $C_1$ and $C_2$, moreover, will ordinarily require unlike adjustments. The impedance $Z_1$ may be considered also as representing a generator and the attenuator as one used for adjusting the power level in the guide $Z_2$ or for reducing reaction back upon the source.

There are some situations in practice where the complications of a characteristic impedance attenuator are not warranted. In such instances an attenuator of the kind shown in Fig. 27 may be employed. Here the attenuator comprises only two coaxial units $C_1$ and $C_2$ with the absorptive impedance Z associated with one of them, viz., $C_1$. The amount of attenuation is controlled by adjustment either of coaxial unit $C_2$ or of both coaxial units.

Although the principles underlying the present invention and its various applications have been thus far described with reference to systems employing waves of the $H_{11}$ type, the invention is also applicable to systems employing other types of waves. Examples of the application of the invention to systems employing waves of the symmetric magnetic or $H_{01}$ type are illustrated in Figs. 28 to 33.

As shown in Fig. 28 a circular conducting loop coaxial with the guide is appropriate for effecting a coupling with symmetric magnetic waves. One terminal of the conducting loop is extended radially outward as the central conductor of a coaxial unit and the other terminal of the loop is connected to the outer conductor of that unit. Preferably, the outer conductor of the coaxial unit is extended radially inward to shield completely the inner conductor in order to suppress radiation of a spurious radial field. Whereas in Fig. 28 the reactance element comprises a coaxial unit, in Fig. 29 it comprises a shielded pair provided with a short-circuiting piston for adjusting the electrical length of the two-wire line. Fig. 30 shows only how an impedance element Z may be associated with the conducting loop to alter its impedance. Figs. 31 and 32 show variable impedance elements comprising in the one case a series connected impedance element Z and a coaxial type of reactance and in the other case a shunt impedance element Z and a shielded two-wire line type of reactance. Corresponding with the double coaxial impedance transforming device of Fig. 24 is the combination shown in Fig. 33 which comprises the elementary combination shown in Fig. 30 and differently directed radial coaxial units $C_1$ and $C_2$, the inner conductors of which are connected to different points on the circular current loop.

Figure 34:
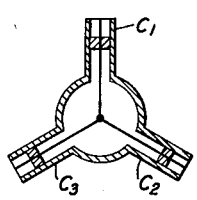
Figs. 34 to 42 are applicable similarly in the case of symmetric and asymmetric electric types of guided waves.
Figure 35:
Figure 36:
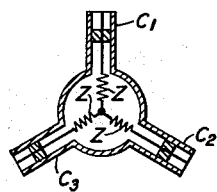
Figure 37:
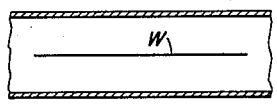
Figure 38:
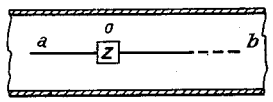
Figure 39:
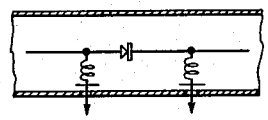
Figure 40:
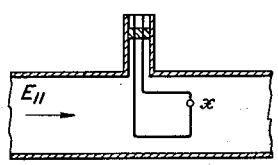
Figure 41:
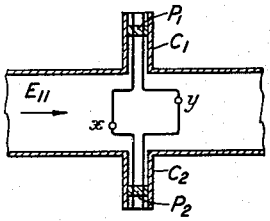
Figure 42:
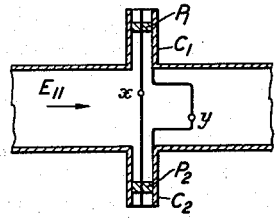

As may be seen in Figs 1 and 2 the symmetric electric or $E_{01}$ type of wave has both transverse and longitudinal electric field components. In applying reactive elements and impedance transformers in accordance with the present invention, it is possible in the case of such waves to operate on either or both of the field components. In Fig. 34 is shown a reactive device operating only on the transverse field. It comprises a plurality of radial conducting wires which extend through openings in the wave guide to form the respective inner conductors of outwardly extending coaxial units $C_1$, $C_2$ and $C_3$. In view of the symmetry of both field and structure, it is desirable that the coaxial units be adjusted alike. Whereas one coaxial unit would suffice to obtain a reactive effect, it is preferred that at least three such units be employed in order that the reactive effect be obtained over the entire field of the guided wave. Fig. 35 shows how impedance elements should be disposed in the radial conductors and Fig. 36 shows the application of these impedance elements to the reactive device of Fig. 34 whereby the effect of a variable impedance element can be obtained.

Where the guided wave has a longitudinal electric field component a reactive effect may be obtained by disposing a wire longitudinally within the wave guide, preferably in the region of maximum longitudinal electric intensity, and coaxial with the guide in the case of the symmetric electric type of wave. A typical arrangement is shown in Fig. 37 where the axial wire W introduces a reactance the nature and magnitude of which depends on the length of the wire. By inserting an impedance element Z in the axial wire, as shown in Fig. 38, and by proper adjustment of the length of the wire and of the position of the impedance element therein, that is, of the lengths $ao$ and $ob$, an impedance match may be obtained. Where, as shown in Fig. 39, the impedance element is a crystal detector or other variable impedance, external connections may be made by means of radial chokes supplemented by by-pass condensers at the points where the radial connections extend through the guide wall.

Where the guided wave is of the asymmetric electric or $E_{11}$ type, good coupling can be provided by a conductive loop disposed within the guide with the longitudinal portions coinciding with the regions of maximum longitudinal electric intensity. These two regions may be seen on reference to Fig. 3. The axial length of the loop is more or less arbitrary and the length of it may be compensated by adjustable coaxial and shielded pair units as disclosed in Figs. 40, 41 and 42. As illustrated the combinations are operative as substantially pure reactances but they may be converted to variable impedance elements by inserting impedances at suitable points such as $x$ and $y$. With impedances inserted in the combinations of Figs. 41 and 42, these combinations are adapted to operate as impedance transformers.

It is contemplated that the various reactive and impedance transforming devices shown in Figs. 5, 28 to 42, inclusive, shall be used in the various terminations, attenuators, loading schemes, etc. disclosed and described hereinbefore with reference to asymmetric magnetic guided wave systems.

Whereas the coaxial and shielded pair units hereinbefore disclosed extend radially outward from the guide there are situations where it is advantageous that these units be brought out axially. Various examples of this type of construction are shown in Figs. 43 to 50, inclusive.

Figure 43:
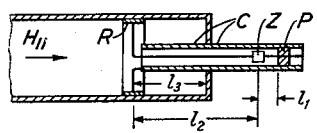
Figs. 43 to 50 represent embodiments of the invention in which the shielded line is coaxial with the wave guiding structure.
Figure 44:
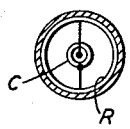

Figs. 43 and 44 show a termination for a wave guide carrying waves of the $H_{11}$ type. Near the closed end of the guide a diametral pick-up wire is provided the ends of which extend to a metallic ring R which is slidable along the guide, and the conductor is interrupted near its center for connection to the end of a coaxial line C which extends through the end cap of the guide and which is short-circuited by piston P. The impedance element Z is connected in energy transfer relation with the coaxial line and in the case illustrated the connection is a series one. An impedance matching termination may be achieved by correlated adjustment of the three lengths indicated in Fig. 43 in accordance with the principles of operation which have been described hereinbefore.

Figure 45:
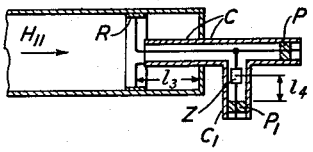

An alternative form of termination for an $H_{11}$ system is shown in Fig. 45 where the impedance element Z is disposed in a short-circuited coaxial line $C_1$ that branches from an intermediate point along the axially disposed coaxial line C. Here the coaxial line C is made resonant by adjustment of the distances $l_2$ and $l_3$ indicated in Fig. 43 and the impedance Z in the branch coaxial line is made to appear equal to the impedance presented by the axially disposed coaxial unit by suitable adjustment of the distance $l_4$ from the impedance element to the reflecting piston $P_1$ in the branch line. The distance $l_3$ may be either fixed or adjustable, but if it is fixed it is preferable to avoid distances too near an integral multiple of a quarter wave-length since these positions involve large transformation ratios that are difficult to attain without excessive energy loss.

Figure 46:
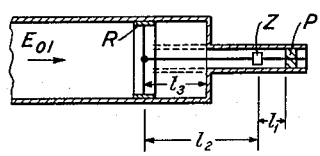
Figure 47:
Figure 48:
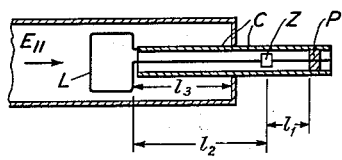
Figure 49:
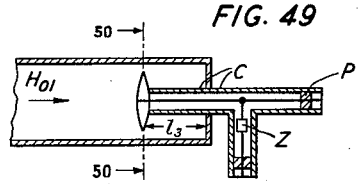
Figure 50:
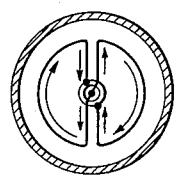

Figs. 46, 48 and 49 show terminations for waves of $E_{01}$, $E_{11}$ and $H_{01}$ types, respectively, and they are similar to the group of terminations last described except for the pick-up circuit. Thus in Fig. 46 the pick-up circuit, shown in greater detail in Fig. 47, comprises instead of the diametral conductor of Fig. 43 a plurality of radial conductors $r$ extending to the sliding ring R; and in Fig. 48 the diametral conductor has been replaced by a conducting loop L of the kind described with reference to Figs. 40 to 42, inclusive. In Figs. 49 and 50 a circular current conducting loop appropriate for symmetric magnetic waves takes the figure 8 form shown in Fig. 50 where the diametral leads carrying oppositely directed current tend to suppress a spurious field. If the impedance Z in any of Figs. 43 to 49 be replaced by a generator, these circuits will serve to launch the same type of wave in the guide and at the same time provide an impedance match between the generator and the guide. Since the coaxial circuit may be the same for all types of waves the same generator may be used for producing any of these waves by inserting the appropriate pick-up circuit.

Figure 51:
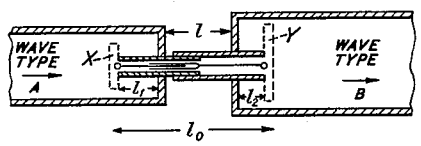
Figs. 51 to 54 are illustrative of wave type converters embodying various features of the present invention.
Figure 52:
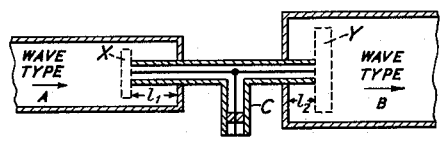

The axial terminations of Figs. 43 to 49, inclusive, may be modified in the manner shown for example in Figs. 51 and 52 to serve as means for converting one type of wave to another.

Fig. 51 shows an arrangement for coupling a guide carying a wave of type A with another guide carrying a wave of type B comprising a telescoping coaxial line that projects through the end caps of the two guides. Pick-up circuits appropriate for the two types of waves are represented at X and Y, respectively. The distance $l_0$ between the two pick-up elements is so chosen that the impedance of X matches that of the coaxial line, and similarly the impedance of the pick-up element Y is matched to the coaxial line. In Fig. 52 the distance between the two pick-up elements is fixed but the electrical length can be altered to achieve the same result by the reactive loading provided by the branch coaxial line C. In either case, the distance $l_1$ and the distance $l_2$ may be adjustable or fixed. In the latter case it is advisable to select distances not too near an integral multiple of a quarter wave-length.

Figure 53:
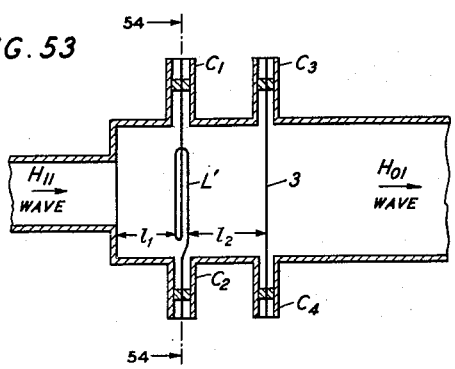
Figure 54:
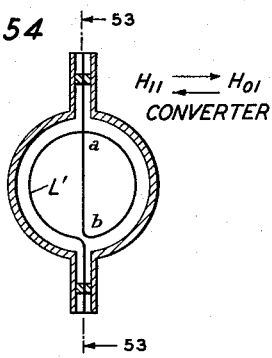

Another form of wave type converter is illustrated in Figs. 53 and 54. Here the incident $H_{11}$ wave passes through a circuit configured as shown in Fig. 54 to a diametral wire 3 which is tuned by coaxial extensions $C_3$ and $C_4$ to operate as a perfect reflector. The wire L' is so disposed that the incident wave induces an electromotive force in the diametral part $ab$ which causes a flow of current through the circular portion connected in series therewith, and it is this circular flow of current that establishes the $H_{01}$ wave desired. The four coaxial pistons and the distances $l_1$ and $l_2$ are adjusted to obtain maximum energy transformation. Preferably the diameter of the guide carrying the $H_{11}$ wave is less than the critical cut-off diameter for $H_{01}$ waves so that the transmission of the latter type of wave into the incoming guide section is suppressed.

What is claimed is:

1. In combination, a metallic pipe carrying dielectrically guided waves through the interior thereof, a shielded transmission line branching laterally from said pipe and in open communication therewith, means for exciting said line with said waves and means for short-circuiting said line at a distance from the said pipe comparable with the length of said waves.

2. A combination in accordance with claim 1 in which said line comprises a pair of coaxial conductors.

3. In a system for the transmission of dielectrically guided waves through a metallic pipe, a shielded transmission line branching laterally from said pipe and closely coupled with the said waves therein, said line being short-circuited at a point such that a substantially pure reactance is presented by said line to the said waves passing through said pipe.

4. A system comprising a metallic pipe for the transmission of dielectrically guided waves and means for introducing a substantially pure reactive impedance in the path of said waves, said means consisting essentially of a short-circuited coaxial conductor line branching from said pipe and closely electrically coupled thereto, and means for exciting said line with said waves.

5. In combination, a wave guide for the transmission of dielectrically guided waves, a transmission line branching from said guide and means for exciting said line with the said waves transmitted through the guide, said line being short-circuited at such point that the said dielectrically guided waves in said wave guide are substantially completely reflected.

6. In combination, a metallic pipe comprising a guide for the transmission of dielectrically guided waves, a metallic circuit disposed within said pipe and excited by said waves, and means so tuning said circuit that the said guided waves incident upon said circuit are substantially completely reflected.

7. The combination with a metallic pipe carrying dielectrically guided waves of a reflecting barrier across said pipe, a translating device in energy transfer relation with said waves, and a phase shifter interposed between said reflecting barrier and said device, the distance between said device and said barrier being comparable with the length of said waves.

8. A combination in accordance with claim 7 in which said phase shifter comprises a metallic circuit aligned with the electric field of said waves and means for modifying the reactance said circuit presents to said waves.

9. In a system comprising a metallic pipe for the transmission of dielectrically guided waves, a translating device adapted to launch or receive said waves, a reflector, and a phase shifter interposed between said device and said reflector, the phase shift introduced by said phase shifter being optimum with respect to the maximum transfer of energy between said device and said waves.

10. In combination with a wave guide carrying dielectrically guided waves and wave translating means connected thereto presenting a reactive impedance to said waves that differs from the impedance of said guide, reactive impedance means comprising a short-circuited shielded transmission line branching from said guide in the vicinity of said translating means and excited by the waves passing therethrough, the electrical length of said line being such as to compensate for the reactance of said translating means whereby the said wave guide and translating means are connected in impedance matching relation.

11. In combination, a dielectric guide comprising a metallic pipe, a termination for said guide the impedance of which differs from the impedance of said guide, and means for reducing the impedance mismatch comprising a coaxial conductor line branching from said guide and short-circuiting means for adjusting the electrical length of said line.

12. In combination, a wave guide consisting essentially of a metallic pipe, a reflector across said pipe, an impedance element in front of said reflector, a shielded transmission line branching from said pipe at said impedance element, said line being short-circuited and said impedance element being connected in circuit with said line, the reactance of said line being such as to effect an impedance match between said guide and said impedance element.

13. In combination with a metallic pipe constituting a guide for waves of asymmetric magnetic type, a termination for such waves comprising three coaxial conductor lines branching from said pipe at spaced points therealong, the inner conductor of each of said lines extending diametrally through said pipe to the opposite wall thereof and in alignment with the electric field of said waves, the line that is farthest in the direction of wave propagation being short-circuited at such point that the said waves in the pipe are substantially completely reflected, an impedance element disposed between the other two lines and in energy transfer relation with said waves, the said other two lines being short-circuited at such points that the impedance of said element is virtually matched to the impedance of the guide.

14. In combination with a wave guide comprising a metallic pipe, a diametrally disposed conductor extending in both directions through the wall of said pipe, means cooperating with the extended portions of said conductor forming short-circuited coaxial conductor lines, an impedance element interposed in series in said conductor, and a reflector, the positions of said reflector and of the points where said lines are short-circuited being so correlated that said impedance element is matched with the impedance of said guide.

15. In combination with a wave guide consisting essentially of a metallic pipe, a coaxial conductor line branching radially from and closely coupled electrically to said pipe, the inner conductor of said line extending diametrally across said pipe from one side thereof to the other, and means for short-circuiting said line at a distance from the said pipe comparable with the transverse dimensions of said pipe.

16. In combination with a wave guide comprising a metallic pipe, a plurality of conductors radially disposed within said pipe, each of said conductors extending through the wall of said pipe, and means cooperating with the extended portions of said conductors to form short-circuited coaxial conductor lines, each of said lines being in open communication with the interior of said pipe and the electrical lengths of said lines being of the same order of magnitude as the transverse dimensions of said pipe.

17. In combination with a wave guide comprising a metallic pipe, an axially apertured metallic end cap for said guide, a coaxial conductor line extending axially through the aperture in said end cap, means for short-circuiting said line in the vicinity of said end cap, means at the inner end of said line for establishing an energy transfer relation between said line and waves in said pipe, said line being resonant at the frequency of said waves, and a translating circuit connected to an intermediate point of said resonant line such that the impedance of said translating circuit is matched to the impedance presented to it by said line.

18. In a system for the transmission of dielectrically guided waves through a metallic pipe, a terminal structure within said pipe adapted for launching or receiving said waves, a coaxial conductor line in circuit relation with said terminal structure, one end of said line being in open communication with the interior of said pipe, and means for short-circuiting said line at a distance from the open end that is comparable with the wave-length of said waves.

19. A combination in accordance with claim 18 comprising an impedance element electrically interposed in said line.

20. In combination, a wave guide consisting essentially of a metallic pipe and an enclosed dielectric medium, a conductor extending diametrally across said pipe from one side thereof to the other and adapted for launching or receiving guided waves of asymmetric magnetic type, a reflector in said pipe spaced longitudinally from said conductor, and a short-circuited coaxial conductor line closely coupled in circuit relation with said conductor, both the spacing between said reflector and said conductor and the electrical length of said line being comparable with the wave-length of said waves.

21. In combination, a hollow metal pipe constituting a wave guide for high frequency electromagnetic waves, a wave reflecting barrier in said pipe, a terminal structure in front of said reflector comprising a metallic circuit disposed in substantial alignment with the electric field of said waves adapting said structure for excitation by said waves, a shielded multiconductor transmission line closely coupled in circuit relation with said terminal structure, the interior of said shielded line being in open communication with the interior of said pipe, short-circuiting means in said shielded line the longitudinal position of which affects the electrical length of said line, an impedance element and means electrically coupling said impedance element to the waves in said pipe at a point removed from said reflecting barrier by a distance comparable with the length of the said waves, the impedance presented by said element to said guide being a function of the electrical length of said line and the length of said line being so adjusted that said impedance element and said guide are substantially matched in impedance.

22. A combination in accordance with claim 21 in which said terminal structure comprises a conductor extending rectilinearly from one side of said pipe to the other and in which said shielded line comprises a pair of coaxial conductors branching laterally from said pipe with the inner of said coaxial conductors connected as an extension of said conductor comprising said terminal structure.

23. A combination in accordance with claim 21 in which said impedance element is electrically coupled with the waves in said guide at a point between said terminal structure and said reflecting barrier.

24. A combination in accordance with claim 21 in which said impedance element is electrically connected to said shielded transmission line at an intermediate point thereof.

ARCHIE P. KING.